(12) United States Patent
Bayer et al.

(10) Patent No.: US 8,187,451 B2
(45) Date of Patent: May 29, 2012

(54) METHOD AND DEVICE FOR MANUFACTURING INTEGRALLY BLADED ROTORS

(75) Inventors: Erwin Bayer, Dachau (DE); Martin Bussmann, Schwabhausen (DE); Thomas Kraenzler, Salem (DE); Albin Platz, Ried (DE); Juergen Steinwandel, Uhldingen-Muehlhofen (DE)

(73) Assignee: MTU Aero Engines GmbH, Munich (DE)

( * ) Notice: Subject to any disclaimer, the term of this patent is extended or adjusted under 35 U.S.C. 154(b) by 1871 days.

(21) Appl. No.: 11/256,371

(22) Filed: Oct. 21, 2005

(65) Prior Publication Data

US 2006/0085979 A1   Apr. 27, 2006

(30) Foreign Application Priority Data

Oct. 26, 2004   (DE) .......................... 10 2004 051 854

(51) Int. Cl.
*B23H 1/00*   (2006.01)
*B23H 3/00*   (2006.01)
*B23H 3/06*   (2006.01)
*B23H 7/12*   (2006.01)

(52) U.S. Cl. .................. 205/640; 219/69.15; 219/69.17; 219/69.2

(58) Field of Classification Search .................. 205/640; 219/69.15, 69.17, 69.2
See application file for complete search history.

(56) References Cited

U.S. PATENT DOCUMENTS 3,288,699 A    11/1966   Kemps et al. .................. 204/224

FOREIGN PATENT DOCUMENTS

| EP | 0 426 233 | 2/1993 |
|---|---|---|
| EP | 1 314 507 | 5/2003 |
| SU | 965 689 | 10/1982 |

*Primary Examiner* — Jeffrey T Barton
*Assistant Examiner* — Zulmariam Mendez
(74) *Attorney, Agent, or Firm* — Davidson, Davidson & Kappel, LLC

(57) ABSTRACT

A method for manufacturing integrally bladed rotors (preferably gas turbine rotors) is provided. The method includes the steps of a) providing a basic rotor body; b) placing the basic rotor body into an electrolyte; c) electrochemically machining the basic rotor body by simultaneously manufacturing a plurality of unmachined blades; and d) subsequently machining the unmachined blades to provide hydrodynamic surfaces, in particular a suction side and a pressure side, in the area of each unmachined blade.

27 Claims, 2 Drawing Sheets

US 8,187,451 B2

METHOD AND DEVICE FOR MANUFACTURING INTEGRALLY BLADED ROTORS

Priority is claimed to German Application Serial No. DE 10 2004 051 854.8, filed Oct. 26, 2004, the entire disclosure of which is hereby incorporated by reference herein.

FIELD OF THE INVENTION

The present invention relates to a method for manufacturing integrally bladed rotors, gas turbine rotors in particular. Furthermore, the present invention relates to a device for manufacturing integrally bladed rotors, gas turbine rotors in particular.

BACKGROUND

Rotors such as gas turbine rotors have a basic rotor body and a plurality of rotor blades. The rotor blades are either anchored in appropriate recesses of the basic rotor body via blade feet or are integral components of the basic rotor body. Integrally bladed rotors are referred to as blisks (bladed disk) or blings (bladed ring), depending on whether a disk-shaped or ring-shaped basic rotor body is used. The present invention relates to a method and a device for manufacturing a rotor having integral blades.

In manufacturing integrally bladed rotors accord mg to the related art, recesses serving as blade gaps are normally made in a basic rotor body for providing unmachined blades; the unmachined blades are subsequently subjected to finishing machining. In the related art, the recesses serving as blade gaps are usually made by cutting. However, cutting is problematic and uneconomical, in particular for difficult-to-cut materials. The recesses serving as blade gaps can also be manufactured by wire erosion or water jet cutting. However, wire erosion and water jet cutting have the disadvantage that only straight cutting surfaces are possible, so that it is not possible to manufacture the recesses, i.e., the unmachined blades, by following the contours.

SUMMARY OF THE INVENTION

An object of the present invention is to provide a novel method for manufacturing integrally bladed rotors, gas turbine rotors in particular, and a corresponding device.

This object is achieved by a method for manufacturing integrally bladed rotors, gas turbine rotors in particular. The method according to the present invention includes the steps of: a) providing a basic rotor body; b) placing the basic rotor body into an electrolyte; c) electrochemically machining the basic rotor body by simultaneously manufacturing a plurality of unmachined blades by moving a plurality of working electrodes simultaneously into the basic rotor body by a relative motion between the basic rotor body and the working electrodes to form a plurality of recesses in the basic rotor body, said recesses defining blade gaps between the unmachined blades, the relative motion having a translational motion component and a rotational motion component; d) subsequently machining the unmachined blades to provide hydrodynamic surfaces, preferably a suction side and a pressure side, in the area of each unmachined blade.

According to the present invention, it is provided that the recesses serving as blade gaps are produced by electrochemical machining of the basic rotor body. To do so, according to the present invention a plurality of working electrodes are moved simultaneously into the basic rotor body to produce a plurality of recesses serving as blade gaps. For this purpose, a relative motion is established between the working electrodes and the basic rotor body, the relative motion having a translational motion component and a rotational motion component, which at least partially overlap. Due to the overlap of the translational motion component and the rotational motion component in producing the recesses serving as blade gaps, helical contour-shaped recesses are produced, which are already adapted to the desired final contour of the blades of the integrally bladed rotor. This makes it possible to efficiently manufacture integrally bladed rotors by electrochemical machining.

According to another embodiment of the present invention, in step c) described above, the working electrodes are moved into the basic rotor body in such a way that in a first substep the relative motion has a translational motion component and an overlapping rotational motion component, and in a second substep following the first substep the relative motion has exclusively a rotational motion component.

According to another embodiment of the present invention, in step c) described above, the translational motion component of the working electrodes proceeds in the axial direction, i.e., in the direction of a longitudinal central axis of the basic rotor body.

According to another embodiment of the present invention, in step c) described above, an axis of rotation of the rotational motion component coincides with the longitudinal central axis, i.e., the axis of rotation of the rotor to be manufactured.

The unmachined blades are preferably machined to provide hydrodynamic surfaces according to step d) described above by electrochemical machining, in particular by a PECM process. Alternatively, this finishing machining may also be performed by mechanical cutting.

The device according to the present invention for manufacturing integrally bladed rotors, gas turbine rotors in particular contains a receptacle for a basic rotor body and electrolyte, a plurality of working electrodes situated on a shared carrier which are movable into the basic rotor body simultaneously by a relative motion between the basic rotor body and the working electrodes, the relative motion having a translational motion component and a rotational motion component.

BRIEF DESCRIPTION OF THE DRAWINGS

An exemplary embodiment of the invention is described, without being restricted thereto, with reference to the following drawings.

DETAILED DESCRIPTION

To manufacture an integrally bladed rotor according to the present invention, a basic rotor body 10 is provided, basic rotor body 10 being positioned in a receptacle 11 of a device labeled overall with the reference number 12 for manufacturing an integrally bladed rotor.

Figure 1:
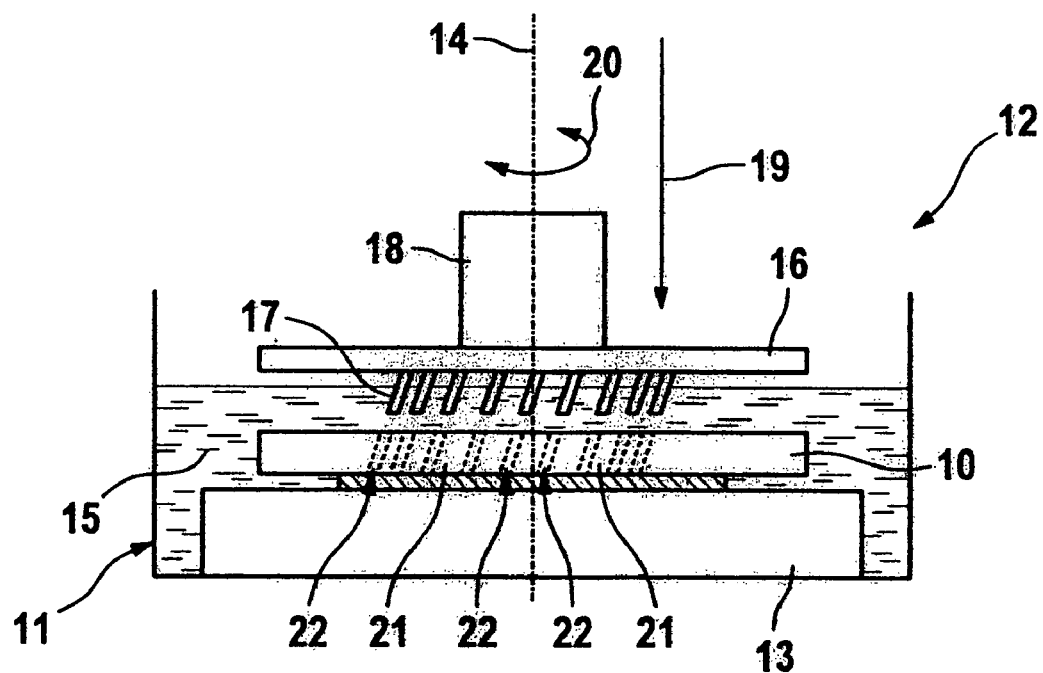
FIG. 1 shows a schematic drawing of a device according to the present invention for manufacturing integrally bladed rotors, namely for simultaneously manufacturing a plurality of unmachined blades, i.e., a plurality of recesses serving as blade gaps, together with a basic rotor body in a first state.

Receptacle 11 of device 12 includes a holding device 13, on which basic rotor body 10 is placed. Basic rotor body 10 is rotatably mounted on holding device 13. According to FIG. 1, basic rotor body 10 is positioned on the holding device in such a way that a longitudinal central axis 14 of basic rotor body 10 extends in the vertical direction. A radial direction of basic rotor body 10 will then extend horizontally when basic rotor body 10 is placed on holding device 13 as shown in FIG. 1. As FIG. 1 shows, receptacle 11 is used both for mounting basic rotor body 10 and for receiving an electrolyte 15, which is required for the subsequent electrochemical machining (ECM) of basic rotor body 10.

Device 12 according to the present invention also includes a carrier 16, to which a plurality of identical working electrodes 17 are attached. Carrier 16 is designed as a plate and is attached to a tool carrier 18, working electrodes 17, together with carrier 16 and tool carrier 18 being translationally displaceable in the direction of arrow 9 and rotatable according to arrow 20. All working electrodes 17 are thus movable jointly both translationally and rotationally at the same time. Working electrodes 17 extend approximately coaxially with longitudinal central axis 14 of basic rotor body 10.

To manufacture the integrally bladed rotor, working electrodes 17 mounted on carrier 16 are now simultaneously moved into basic rotor body 10 to simultaneously manufacture a plurality of unmachined blades 21, i.e., a plurality of recesses 22 situated between unmachined blades 21 and serving as blade gaps. For this purpose, a relative motion is established between working electrodes 17 and basic rotor body 10, the relative motion having a translational motion component and a rotational motion component.

According to the present invention, working electrodes 17 are moved into basic rotor body 10 in such a way that in a first substep the relative motion between working electrodes 17 and basic rotor body 10 has a translational motion component according to arrow 19 and an overlapping rotational motion component according to arrow 20. Due to this overlap of the translational displacement of working electrodes 17 and a rotational motion of same, working electrodes 17 are moved helically into basic rotor body 10. The translational motion component of the working electrodes in this substep has an axial direction, i.e., the direction of longitudinal central axis 14 of the basic rotor body. An axis of rotation of the rotational motion component coincides with longitudinal central axis 14, i.e., the axis of rotation of the rotor to be manufactured.

This first substep is followed by a second substep, in which the relative motion between working electrodes 17 and basic rotor body 10 has only a rotational motion component according to arrow 23. An axis of rotation of the rotational motion component again coincides with longitudinal central axis 14, i.e., the axis of rotation of the rotor to be manufactured.

Figure 2:
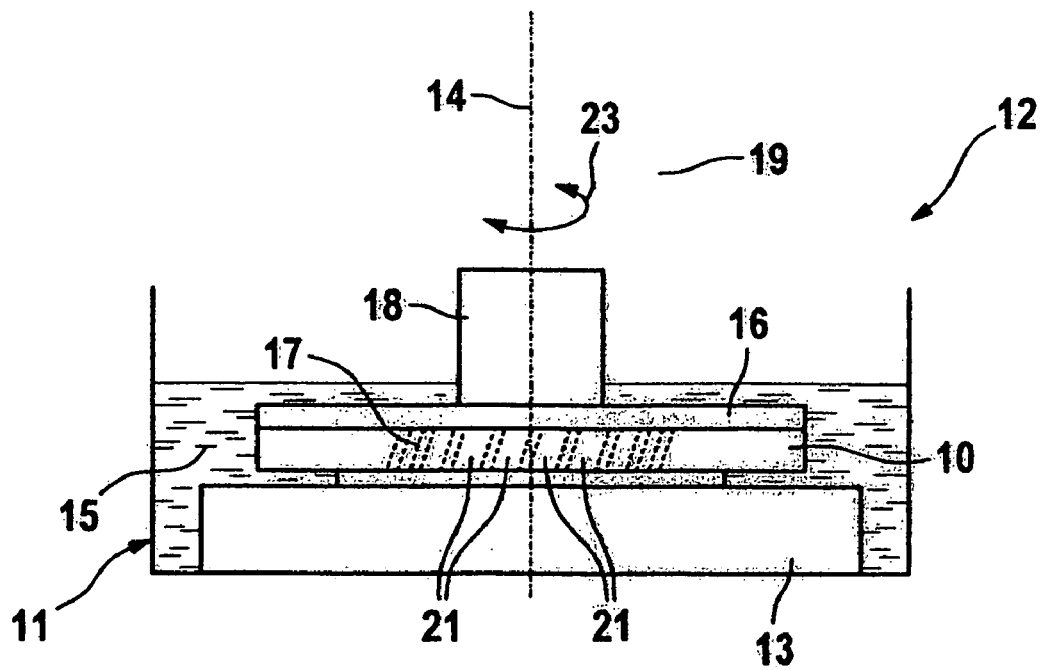
FIG. 2 shows the device of FIG. 1, together with the basic rotor body in a second state.

The first substep is shown in FIG. 1 and the second substep in FIG. 2. In the second substep according to FIG. 2, helical recesses 22, produced in the first substep according to FIG. 1, are widened in the peripheral direction of basic rotor body 10 to the required size. By simultaneously changing the relative position between all working electrodes 17 attached to carrier 16 and basic rotor body 10, a plurality of recesses 21 are machined simultaneously also in this substep.

The translational relative motion between working electrodes 17 and basic rotor body 10 in the first substep according to FIG. 1 is established by lowering working electrodes 17 in the direction of arrow 19 relative to basic rotor body 10. The rotational motion component may be established by rotating the working electrodes and/or basic rotor body 10. This applies to both the first substep according to FIG. 1 and the second sub step according to FIG. 2.

It should be pointed out here that between the first substep according to FIG. 1 and the second substep according to FIG. 2, working electrodes 17 are again preferably moved out of the recesses produced in the first substep according to FIG. 1 before being re-introduced into the recesses for widening the recesses in the peripheral direction according to the second substep according to FIG. 2.

As mentioned previously, when manufacturing unmachined blades 21 as described above, a plurality of working electrodes 17 are moved simultaneously in a helical motion into basic rotor body 10. The unmachined blades thus formed have a uniform, i.e., constant, thickness across their axial extent, so that the unmachined blades do not yet have hydrodynamic surfaces such as suction sides and pressure sides. The hydrodynamic surfaces are formed on the unmachined blades in a subsequent machining step.

Before going into the details regarding the machining of unmachined blades 21 to produce hydrodynamic surfaces, it should be pointed out that the number of electrodes 17 which are mounted on carrier 16 corresponds to the number of recesses 22 to be simultaneously produced. Thus, according to the present invention, all recesses 22 serving as blade gaps may be produced simultaneously over the periphery of basic rotor body 10. For this purpose, the appropriate number of working electrodes 17 is positioned over the entire periphery of carrier 16.

However, FIGS. 1 and 2 show an embodiment in which recesses 22 serving as blade gaps are produced consecutively by peripheral segments, a plurality of recesses 22 serving as blade gaps being produced simultaneously for each peripheral segment. Thus, according to FIG. 1, a total of nine working electrodes 17, covering a peripheral segment of 45° for example, are attached to carrier 16 with the aid of which nine recesses 22 serving as blade gaps may be produced simultaneously. After producing these recesses, the relative position between carrier 16, i.e., working electrodes 17 and basic rotor body 10, is changed in such a way that subsequently more recesses 22 serving as blade gaps may be simultaneously produced in an adjacent peripheral segment. If working electrodes 17 cover a peripheral segment of 45°, they are moved into the basic rotor body a total of eight times as described above. In this way recesses 22 are produced consecutively in the different peripheral segments, a plurality of recesses 22 being produced simultaneously in each peripheral segment. The size of the peripheral segments covered by working electrodes 17 is preferably between 15° and 90°, in particular between 30° and 60°. A preferred peripheral segment size is 45°. If all recesses are produced simultaneously over the periphery of the basic rotor body, this means a peripheral segment of 360°. The size of the peripheral segments is a function of the available electric current needed for the electrochemical machining of the basic rotor body.

Regarding the simultaneous production of a plurality of unmachined blades, i.e., a plurality of recesses 22 serving as blade gaps, it should be pointed out that uniform flushing of recesses 22 to be produced with electrolyte is ensured. This may be accomplished, for example, by recirculating electrolyte 15 with the aid of a pump. Working electrodes 17 may also be designed as hollow electrodes through which electrolyte flows. Thus, according to the present invention, for example, working electrodes 17, which are mounted on carrier 16, may be designed as hollow electrodes having a porous surface in such a way that electrolyte flows within working electrodes 17, reaching, via the porous surface of the working electrodes, the area of recesses 22 to be produced. This allows a uniform electrolyte supply in the area of recesses 22 to be produced to be implemented.

Following the manufacture of the unmachined blades as described above, according to the present invention unmachined blades 21 are machined to produce hydrodynamic surfaces, namely to produce a suction side and a pressure side in the area of each unmachined blade. This machining of the unmachined blades to produce hydrodynamic surfaces is also referred to as finishing machining and is preferably implemented according to the present invention by electrochemical machining, preferably by a PECM (precise electrochemical machining) process.

To produce the hydrodynamic surfaces in the area of unmachined blades 21, at least one corresponding working electrode 24 (see FIG. 3) is moved with respect to unmachined blades 21, the relative motion between working electrode 24 and the particular unmachined blade having a translational motion component according to arrow 25 and a rotational motion component according to arrow 26. The translational motion component has the radial direction of the particular unmachined blade and an axis of rotation of the rotational motion component coincides with a feed axis of the translational motion component. The feed axis of the translational motion component and therefore the axis of rotation of the rotational motion component is denoted in FIG. 3 with the reference symbol 27.

Figure 3:
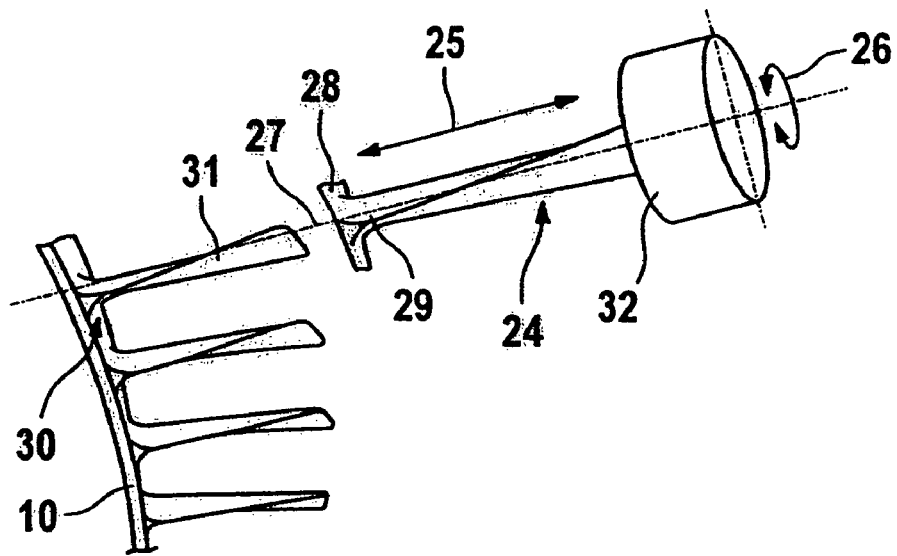
FIG. 3 shows a schematic drawing of another working electrode for subsequent machining of the unmachined blades for producing hydrodynamic surfaces in the area of each machined blade.

Working electrode 24, shown in FIG. 3, for producing a suction side and a pressure side in the area of each unmachined blade 21, is preferably designed as a hollow electrode, the internal contour of the hollow electrode corresponding to the hydrodynamic surface to be produced, namely the suction side and the pressure side. Thus, working, electrode 24 has basically two sections 28 and 29, section 28 being used for producing hydrodynamic surfaces in a transition area 30 between a blade 31 and basic rotor body 10, and section 29 being used for producing the suction side and pressure side of blade 31. Working electrode 24 is mounted on a carrier 32, via which working electrode 24 may be moved translationally in the direction of arrow 25 and rotationally in the direction of arrow 26. With the aid of working electrode 24 shown in FIG. 3, each unmachined blade is machined consecutively, hydrodynamic surfaces being consecutively produced in the area of each unmachined blade.

Figure 4:
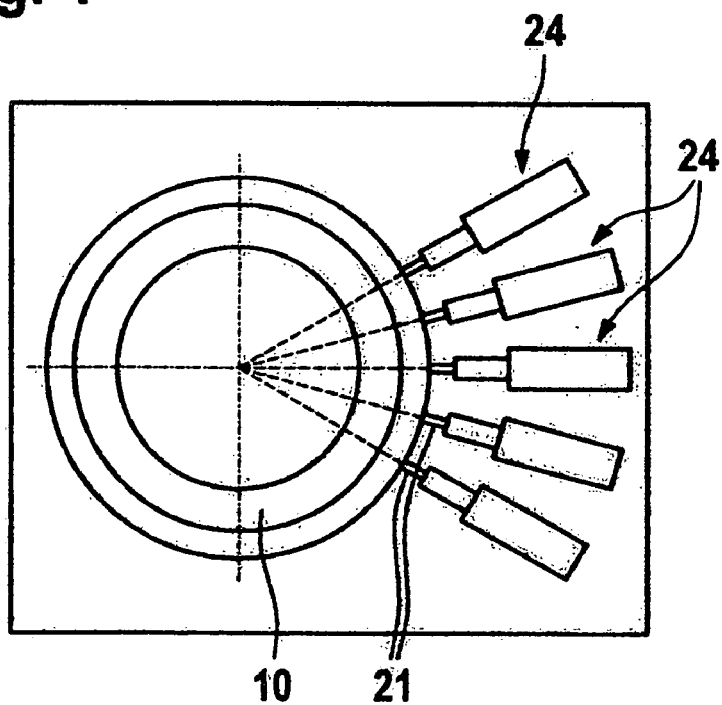
FIG. 4 shows a schematic drawing of a plurality of cooperating working electrodes according to FIG. 3.

FIG. 4 shows a system of a plurality of working electrodes 24 for simultaneously machining a plurality of unmachined blades 21 to produce hydrodynamic surfaces. Each working electrode 24 is preferably controlled by a dedicated motor to provide the required translational motion and the overlapping rotational motion for working electrodes 24.

In the above context, it was assumed that the or each working electrode 24 which is used for producing hydrodynamic surfaces in the area of the unmachined blades is designed as a hollow electrode. It should be pointed out that, of course, separate suitably adapted working electrodes may also be used for machining a suction side ani a pressure side of an unmachined blade.

The method according to the present invention for manufacturing an integrally bladed gas turbine rotors is therefore divided into two main steps:

In a first main step a plurality of unmachined blades, i.e., recesses serving as blade gaps, are simultaneously worked into a basic rotor body. In a first substep (see FIG. 1) of this first main step, a plurality of working electrodes are moved simultaneously into the basic rotor body in a helical motion. The helical motion of the working electrodes results from the overlap of a translational motion and a rotational motion. In a second substep (see FIG. 2) of the first main step, the recesses produced in the first substep are widened in the peripheral direction by establishing a rotational relative motion between the working electrodes and the basic rotor body.

Subsequently, in a second main step (see FIG. 3), the unmachined blades produced in the first main step are machined. Thus, in the second main step each unmachined blade is machined in such a way that subsequently hydrodynamic surfaces, namely a suction side and a pressure side, are obtained in the area of each blade. The second main step is preferably also performed by electrochemical machining with the help of a working electrode. It should be pointed out that the second main step may also be alternatively performed by mechanical cutting.

The present invention makes efficient and cost-effective manufacture of integrally bladed rotors possible.

LIST OF REFERENCE NUMERALS 10 basic rotor body
11 receptacle
12 device
13 holding device
14 longitudinal central axis
15 electrolyte
16 carrier
17 working electrode
18 tool carrier
19 arrow
20 arrow
21 unmachined blade
22 recess
23 arrow
24 working electrode
25 arrow
26 arrow
27 feed axis
28 section
29 section
30 transitional area
31 blade
32 carrier

What is claimed is:

1. A method for manufacturing integrally bladed rotors comprises:
 a) providing a basic rotor body,
 b) placing the basic rotor body into an electrolyte,
 c) electrochemically machining the basic rotor body by simultaneously manufacturing a plurality of unmachined blades, the plurality of unmachined blades being simultaneously manufactured by moving a plurality of working electrodes simultaneously into the basic rotor body by a relative motion between the basic rotor body and the working electrodes to form a plurality of recesses in the basic rotor body, said recesses defining blade gaps between the unmachined blades, the relative motion having a translational motion component and a rotational motion component,
 d) subsequently machining the unmachined blades to produce hydrodynamic surfaces, in particular a suction side and a pressure side, in the area of each unmachined blade.

2. The method as recited in claim 1, wherein, in step c), the translational motion component of the working electrodes is in an axial direction of the basic rotor body.

3. The method as recited in claim 1, wherein, in step c) an axis of rotation of the rotational motion component coincides with a central axis of rotation of the integrally bladed rotor to be manufactured.

4. The method as recited in claim 2, wherein, in step c) an axis of rotation of the rotational motion component coincides with a central axis of rotation of the integrally bladed rotor to be manufactured.

5. The method as recited in claim 1, wherein, in step c) the working electrodes are moved into the basic rotor body in such a way that in a first substep the relative motion has a translational motion component and an overlapping rotational motion component, and in a second substep following the first substep the relative motion has exclusively a rotational motion component.

6. The method as recited in claim 5, wherein, in the first substep, the plurality of working electrodes are jointly lowered into the stationary basic rotor body, and the working electrodes and/or the basic rotor body are simultaneously rotated.

7. The method as recited in claim 5, wherein, in the second substep, the plurality of working electrodes are rotated and/or the basic rotor body is rotated.

8. The method as recited in claim 1, wherein all recesses defining blade gaps are simultaneously produced over a periphery of the basic rotor body.

9. The method as recited in claim 1, wherein, in step c), the recesses defining blade gaps are produced consecutively by peripheral segments, a plurality of recesses serving as blade gaps being produced simultaneously for each peripheral segment.

10. The method as recited in claim 9, wherein a plurality of recesses serving as blade gaps are simultaneously produced in peripheral segments having a size of from 15° to 90°.

11. The method as recited in claim 9, wherein a plurality of recesses serving as blade gaps are simultaneously produced in peripheral segments having a size of from 30° to 60°.

12. The method as recited in claim 5, wherein, in step c), the working electrodes are moved out of the basic rotor body between the first substep and the second substep.

13. The method as recited in claim 1, wherein, in step d), the unmachined blades are machined to provide hydrodynamic surfaces by electrochemical machining.

14. The method as recited in claim 13, wherein the electrochemical machining performed via a PECM process.

15. The method as recited in claim 13, wherein at least one working electrode is moved relative to the unmachined blades to machine the unmachined blades to provide hydrodynamic surfaces.

16. The method as recited in claim 15, wherein the at least one working electrode includes a plurality of electrodes, each of the plurality of electrodes moving relative to a respective one of the unmachined blades, to machine the unmachined blades to provide hydrodynamic surfaces.

17. The method as recited in claim 15, wherein the relative motion between the at least one working electrode and a given one of the unmachined blades being machined has a translational motion component and an overlapping rotational motion component.

18. The method as recited in claim 17, wherein the translational motion component of the at least one working electrode is directed in the radial direction of the given one of the unmachined blades.

19. The method as recited in claim 17, wherein an axis of rotation of the rotational motion component of the at least one working electrode coincides with a feed axis of the translational motion component of the at least one working electrode.

20. The method as recited in claim 1, wherein, in step d) a plurality of unmachined blades are machined simultaneously.

21. The method as recited in claim 1, wherein, in step d), the unmachined blades are machined consecutively.

22. The method as recited in claim 1, wherein the integrally bladed rotors are gas turbine rotors.

23. The method as recited in claim 1, wherein a first set of electrodes performs step c) and at least one second electrode different from the first set of electrodes performs step d).

24. The method as recited in claim 23, wherein the at least one second electrode machines each unmachined blade consecutively.

25. The method as recited in claim 23, wherein the at least one second electrode is a hollow electrode.

26. The method as recited in claim 25, wherein the hollow electrode has an internal contour corresponding to the hydrodynamic surfaces.

27. The method as recited in claim 1 wherein the unmachined blades have a constant thickness across an axial extent.

* * * * *